United States Patent
Sotokawa et al.

(10) Patent No.: US 11,486,650 B2
(45) Date of Patent: Nov. 1, 2022

(54) TOTAL HEAT EXCHANGE ELEMENT, METHOD OF MANUFACTURING TOTAL HEAT EXCHANGE ELEMENT, AND TOTAL HEAT EXCHANGER

(71) Applicant: Mitsubishi Electric Corporation, Tokyo (JP)

(72) Inventors: Hajime Sotokawa, Tokyo (JP); Keiji Kameishi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 379 days.

(21) Appl. No.: 16/494,332

(22) PCT Filed: Mar. 31, 2017

(86) PCT No.: PCT/JP2017/013752
§ 371 (c)(1),
(2) Date: Sep. 16, 2019

(87) PCT Pub. No.: WO2018/179393
PCT Pub. Date: Oct. 4, 2018

(65) Prior Publication Data
US 2020/0080790 A1 Mar. 12, 2020

(51) Int. Cl.
*F28D 9/00* (2006.01)
*F28F 3/02* (2006.01)
*F28F 3/08* (2006.01)

(52) U.S. Cl.
CPC ............ *F28D 9/0025* (2013.01); *F28F 3/025* (2013.01); *F28F 3/08* (2013.01); *F28F 2210/10* (2013.01);
(Continued)

(58) Field of Classification Search
CPC .......... F24F 12/006; F24F 3/147; F28F 3/025; F28D 9/0062; F28D 9/0025; F28D 21/0015
See application file for complete search history.

(56) References Cited

U.S. PATENT DOCUMENTS 7,320,361 B2 * 1/2008 Arai ...................... F28D 9/0062
165/166
8,590,606 B2 * 11/2013 Arai ...................... F28D 9/0062
165/166
(Continued)

FOREIGN PATENT DOCUMENTS

JP 2005121264 A 5/2005
JP 2006071150 A 3/2006
(Continued)

OTHER PUBLICATIONS

S. Ghose, K.A. Watson, D.C. Working, J.W. Connell, J.G. Smith Jr., Y.P. Sun, Thermal conductivity of ethylene vinyl acetate copolymer/nanofiller blends, Feb. 7, 2008, Composites Science and Technology 68 (2008) 1843-1853 (Year: 2008).*
(Continued)

*Primary Examiner* — Jianying C Atkisson
*Assistant Examiner* — For K Ling
(74) *Attorney, Agent, or Firm* — Buchanan Ingersoll & Rooney PC (57) ABSTRACT

A total heat exchange element includes a stacked body that is formed by alternately stacking a first layer provided with a first passage through which a first air flow passes and a second layer provided with a second passage through which a second air flow passes. The stacked body includes a partition member between the first layer and the second layer, a spacing member provided in the first layer and the second layer and maintaining a spacing between the partition members facing each other, and a latent heat shielding
(Continued)

member provided partly on the partition member and shielding transfer of latent heat between the first air flow and the second air flow through the partition member.

16 Claims, 9 Drawing Sheets

(52) U.S. Cl.
CPC ..... *F28F 2270/00* (2013.01); *F28F 2275/025* (2013.01)

(56) References Cited

U.S. PATENT DOCUMENTS

| | | | |
|---|---|---|---|
| 9,429,366 B2* | 8/2016 | Dubois | B32B 27/302 |
| 2005/0082045 A1 | 4/2005 | Takada et al. | |
| 2008/0047699 A1 | 2/2008 | Takada et al. | |
| 2010/0032145 A1* | 2/2010 | Lee | F24F 3/147 |
| | | | 165/133 |
| 2010/0175859 A1* | 7/2010 | Takada | B21D 53/04 |
| | | | 165/168 |
| 2011/0120693 A1* | 5/2011 | Kammerzell | F28F 13/06 |
| | | | 165/201 |
| 2014/0014289 A1* | 1/2014 | Tan | F28D 9/0025 |
| | | | 165/10 |

FOREIGN PATENT DOCUMENTS

| | | |
|---|---|---|
| JP | 2009210236 A | 9/2009 |
| JP | 2014173787 A | 9/2014 |

OTHER PUBLICATIONS

International Search Report (PCT/ISA/210) dated Jun. 20, 2017, by the Japan Patent Office as the International Searching Authority for International Application No. PCT/JP2017/013752.

Written Opinion (PCT/ISA/237) dated Jun. 20, 2017, by the Japan Patent Office as the International Searching Authority for International Application No. PCT/JP2017/013752.

* cited by examiner

TOTAL HEAT EXCHANGE ELEMENT, METHOD OF MANUFACTURING TOTAL HEAT EXCHANGE ELEMENT, AND TOTAL HEAT EXCHANGER

FIELD

The present invention relates to a total heat exchange element for performing total heat exchange between air flows, a method of manufacturing the total heat exchange element, and a total heat exchanger.

BACKGROUND

There is known a total heat exchanger that performs total heat exchange between a supply air flow from the outside of a room to the inside of the room and an exhaust air flow from the inside of the room to the outside of the room. Ventilation using the total heat exchanger improves the efficiency of heating/cooling and the efficiency of humidifying/dehumidifying the room, and can reduce the energy used for air conditioning of the room. A total heat exchange element included in the total heat exchanger transfers sensible heat and latent heat between a passage through which the supply air flow passes and a passage through which the exhaust air flow passes. In order to increase the efficiency of total heat exchange, the total heat exchange element is required to be able to efficiently transfer the sensible heat by improving a heat transfer coefficient between the passages and at the same time efficiently transfer the latent heat by improving vapor permeability between the passages.

Patent Literature 1 discloses that, in a total heat exchange element including a passage formed between a plurality of heat transfer plates stacked while spaced from one another, the passage is provided with ridges and grooves. According to the technique of Patent Literature 1, the ridges and grooves generate air flow disturbance to achieve efficient transfer of the latent heat.

CITATION LIST

Patent Literature

Patent Literature 1: Japanese Patent Application Laid-open No. 2009-210236

SUMMARY

Technical Problem

However, according to the technique of Patent Literature 1, the disturbance generated by the ridges and grooves causes an uneven air flow, which in some cases leads to a reduced air flow through part of the passage. In such part of the passage, the air flow is separated from the sensible heat and latent heat transfer surface, whereby the transfer surface transfers less sensible heat and latent heat. As a result, the total heat exchange element is less likely to obtain the effect of improving the total heat exchange efficiency.

The present invention has been made in view of the above, and an object of the present invention is to provide a total heat exchange element that enables total heat exchange with high efficiency.

Solution to Problem

In order to solve the above problem and achieve the object, a total heat exchange element according to an aspect of the present invention includes: a stacked body that is formed by alternately stacking a first layer and a second layer, the first layer being provided with a first passage through which a first air flow passes and the second layer being provided with a second passage through which a second air flow passes. The stacked body includes: a partition member between the first layer and the second layer; a spacing member provided in the first layer and the second layer to maintain a spacing between the partition members facing each other; and a latent heat shielding member provided partly on the partition member to shield transfer of latent heat between the first air flow and the second air flow through the partition member.

Advantageous Effects of Invention

The total heat exchange element according to the present invention has an effect of enabling total heat exchange with high efficiency.

DESCRIPTION OF EMBODIMENTS

A total heat exchange element, a method of manufacturing the total heat exchange element, and a total heat exchanger according to embodiments of the present invention will now be described in detail with reference to the drawings. Note that the present invention is not limited to the embodiments.

First Embodiment

Figure 1:
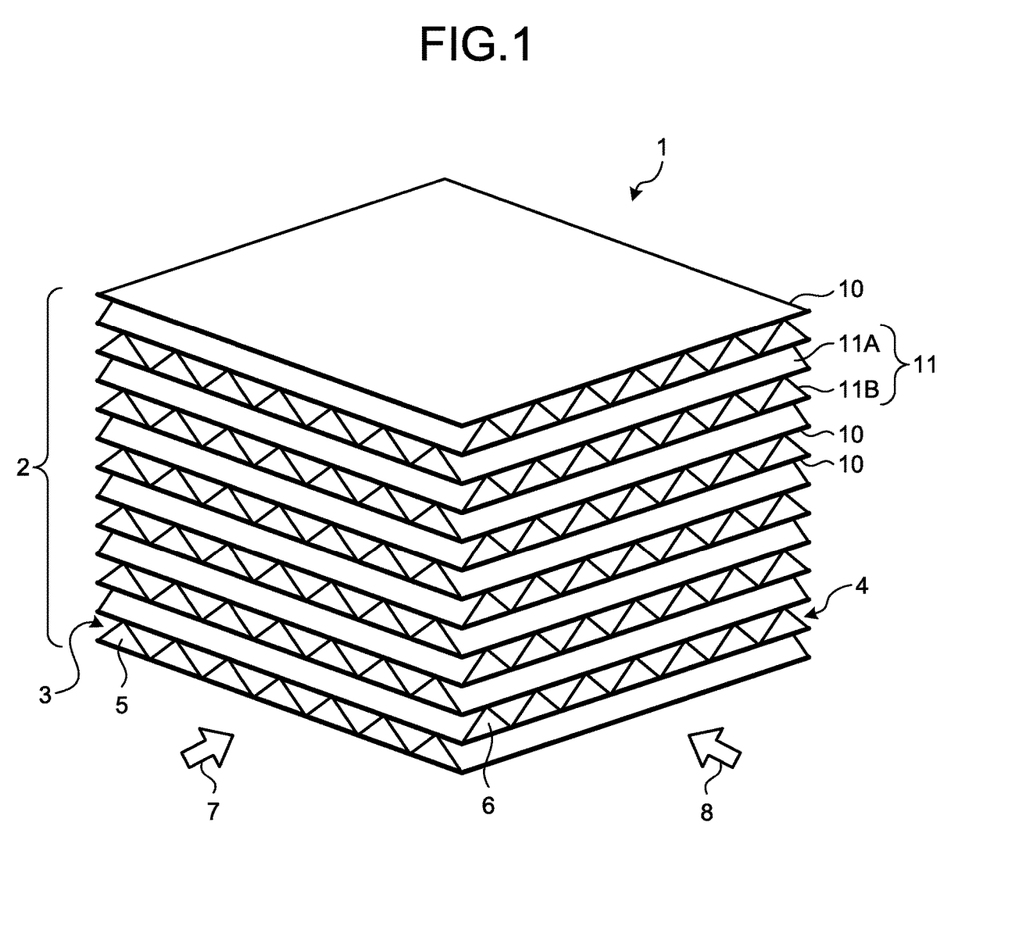
FIG. 1 is a perspective view of a total heat exchange element according to a first embodiment of the present invention.

FIG. 1 is a perspective view of a total heat exchange element 1 according to a first embodiment of the present invention. The total heat exchange element 1 is a crossflow total heat exchange element in which the direction of travel of a first air flow 7 and the direction of travel of a second air flow 8 are perpendicular to each other. The total heat exchange element 1 includes a stacked body 2 in which first layers 3 and second layers 4 are stacked alternately. The first layer 3 is provided with a plurality of first passages 5 through which the first air flow 7 passes. The second layer 4 is provided with a plurality of second passages 6 through which the second air flow 8 passes. The first air flow 7 is a supply air flow from the outside to the inside of a room. The second air flow 8 is an exhaust air flow from the inside to the outside of a room.

The stacked body 2 includes partition members 10 between the first layers 3 and the second layers 4, and spacing members 11 for maintaining the spacing between the partition members 10. The spacing member 11 is provided in each of the first layer 3 and the second layer 4. In the stacked body 2, the partition members 10 processed into flat sheet members and the spacing members 11 formed into corrugated sheet members are stacked alternately. The partition members 10 and the spacing members 11 are bonded to each other by an adhesive. The spacing member 11 is formed in the shape of a triangular wave. FIG. 1 omits illustration of the adhesive.

The spacing members 11 include spacing members 11A having corrugated ridges and grooves with the longitudinal direction corresponding to a first direction and spacing members 11B having corrugated ridges and grooves with the longitudinal direction corresponding to a second direction perpendicular to the first direction. The spacing members 11A and the spacing members 11B are alternately stacked with the partition members 10 interposed therebetween.

The first layer 3 is a portion provided with the spacing member 11A between the partition members 10. The first passages 5 are spaces enclosed by the spacing member 11A and the partition members 10 in the first layer 3. The direction of travel of the first air flow 7 through the first passage 5 coincides with the first direction. The second layer 4 is a portion provided with the spacing member 11B between the partition members 10. The second passages 6 are spaces enclosed by the spacing member 11B and the partition members 10 in the second layer 4. The direction of travel of the second air flow 8 through the second passage 6 coincides with the second direction. The first direction and the second direction are perpendicular to each other.

The partition member 10 is made of a material that has heat transfer property, vapor permeability, and gas barrier property. One example of the material of the partition member 10 is a resin sheet made of various resin materials. The spacing member 11 is made of a material that has a gas barrier property. One example of the material of the spacing member 11 is paper made of cellulose fiber.

The total heat exchange element 1 exchanges sensible heat between the first air flow 7 and the second air flow 8 by heat conduction through the partition members 10. The total heat exchange element 1 also exchanges latent heat between the first air flow 7 and the second air flow 8 by permeation of water vapor through the partition members 10.

Note that the number of each of the first layers 3 and the second layers 4 in the stacked body 2 is arbitrary. Moreover, the number of the first passages 5 in the first layer 3 and the number of the second passages 6 in the second layer 4 are arbitrary. The spacing member 11 need only be able to maintain a certain spacing between the partition members 10, and may be formed in the shape of a rectangular wave. Alternatively, the spacing member 11 may be a combination of a plurality of plate pieces. The spacing member 11 may be a rib member formed of a resin material.

Figure 2:
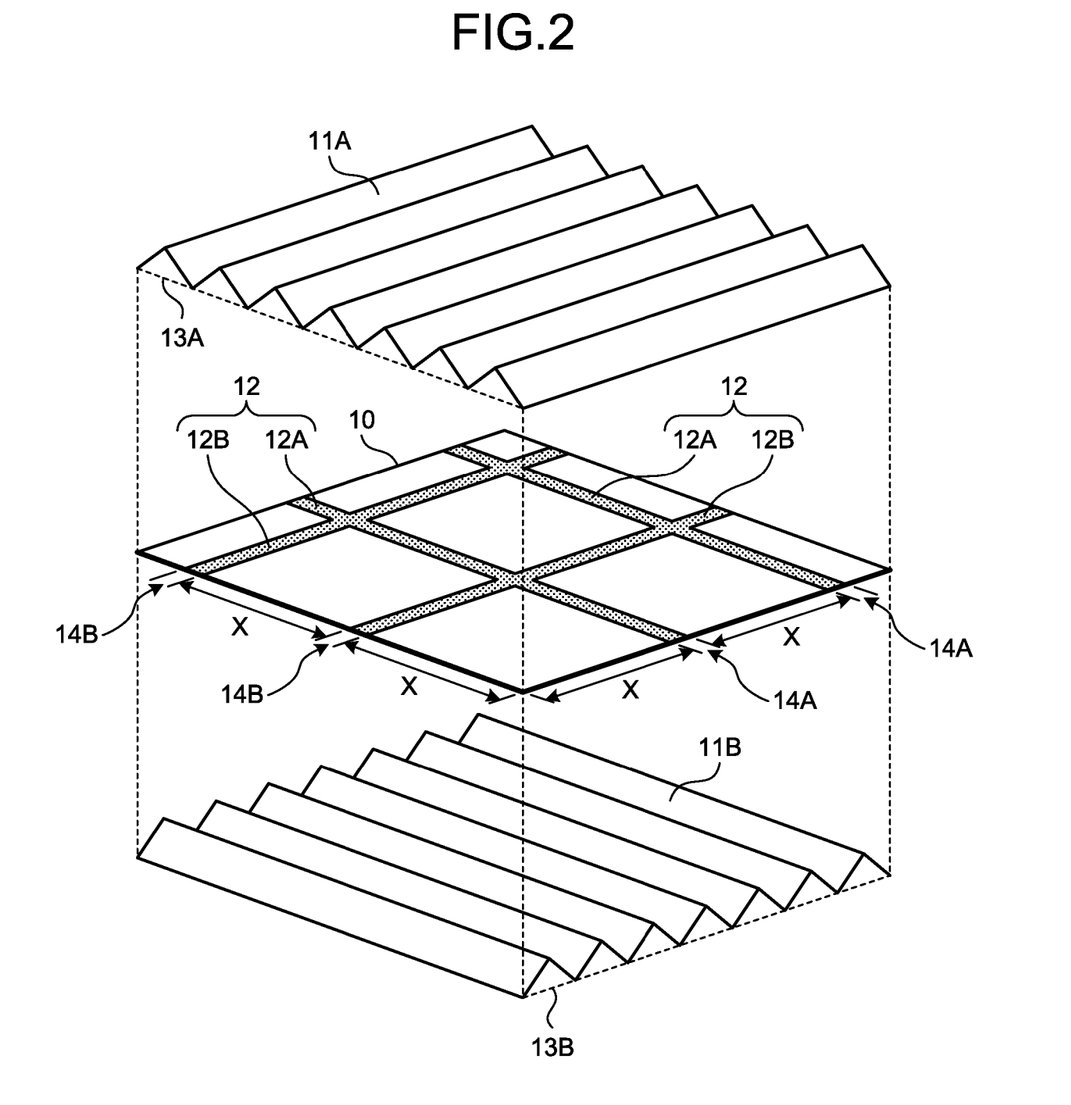
FIG. 2 is a perspective view illustrating a partition member and a spacing member illustrated in FIG. 1.

FIG. 2 is a perspective view illustrating the partition member 10 and the spacing member 11 illustrated in FIG. 1. FIG. 2 illustrates one of the partition members 10 and the spacing members 11A and 11B bonded to the partition member 10. Latent heat shielding members 12 are provided partly on the partition member 10. The latent heat shielding members 12 shield transfer of latent heat between the first air flow 7 and the second air flow 8 through the partition member 10. The latent heat shielding members 12 are provided on each of the partition members 10 in the stacked body 2 illustrated in FIG. 1.

The latent heat shielding members 12 include latent heat shielding members 12A and 12B whose longitudinal directions are perpendicular to each other. The latent heat shielding members 12A are provided in first regions 14A that are band-like regions intersecting the first direction. The longitudinal direction of the first regions 14A coincides with the second direction. The latent heat shielding members 12A are provided to cross the plurality of first passages 5 in the first layer 3. On the partition member 10 illustrated in FIG. 2, the latent heat shielding members 12A are provided in two first regions 14A that are spaced from each other in the first direction. The spacing between an upstream end 13A of the first passage 5 and the first region 14A in which one of the latent heat shielding members 12A is provided and the spacing between the two first regions 14A in which the latent heat shielding members 12A are provided are both set to a length X. Note that the number of the latent heat shielding members 12A per partition member 10 is not limited to two but may be one or three or more.

The latent heat shielding members 12B are provided in second regions 14B that are band-like regions intersecting the second direction. The longitudinal direction of the second regions 14B coincides with the first direction. The latent heat shielding members 12B are provided to cross the plurality of second passages 6 in the second layer 4. On the partition member 10 illustrated in FIG. 2, the latent heat shielding members 12B are provided in two second regions 14B that are spaced from each other in the second direction. The spacing between an upstream end 13B of the second passage 6 and the second region 14B in which one of the latent heat shielding members 12B is provided and the spacing between the two second regions 14B in which the latent heat shielding members 12B are provided are both set to the length X. Note that the number of the latent heat shielding members 12B per partition member 10 is not limited to two but may be one or three or more.

Figure 3:
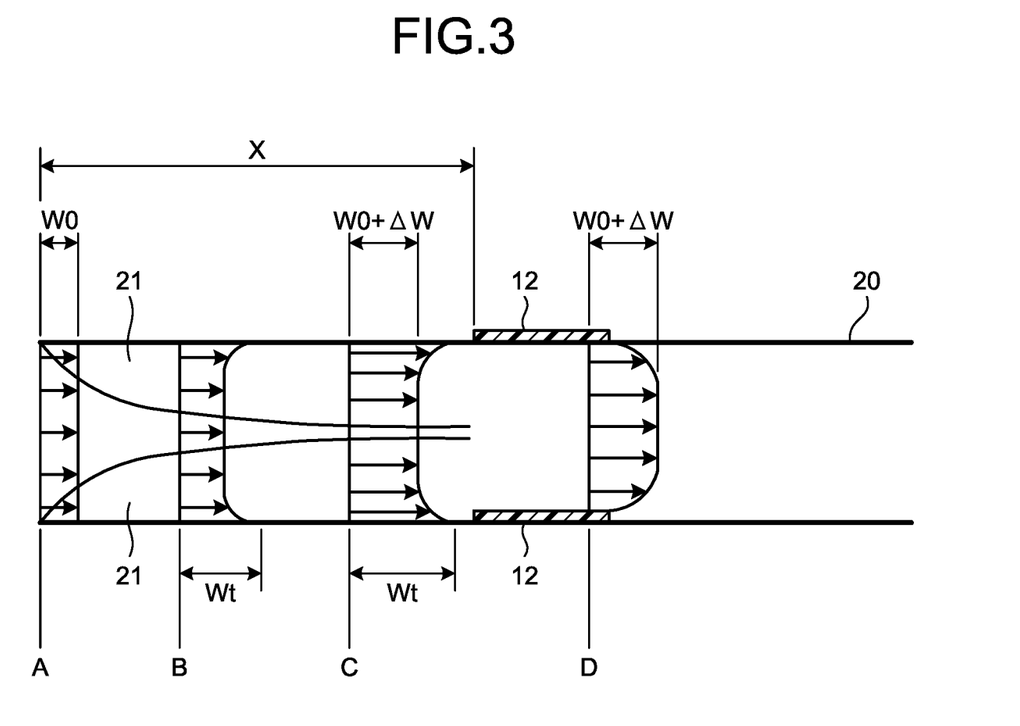
FIG. 3 is an explanatory diagram of an effect obtained by providing a latent heat shielding member illustrated in FIG. 2.

Here, an effect obtained by providing the latent heat shielding member 12 on the partition member 10 will be described. FIG. 3 is an explanatory diagram of the effect obtained by providing the latent heat shielding member 12 illustrated in FIG. 2. There will be described a case where the first passage 5 or the second passage 6 is replaced by a cylindrical passage 20, and the latent heat shielding member 12 is provided on the wall surface of the cylindrical passage 20. FIG. 3 illustrates a vertical cross section of the cylindrical passage 20 and a change in the humidity inside the cylindrical passage 20 by a change in the length of the arrows. Passages through which an air flow containing water vapor passes are provided above and below the cylindrical passage 20 illustrated in FIG. 3, and the latent heat of such an air flow passes through the wall surface of the cylindrical passage 20 and is transferred to an air flow passing through the cylindrical passage 20. FIG. 3 omits the illustration of the passages above and below the cylindrical passage 20.

It is assumed that air with an absolute humidity W0 flows from outside the cylindrical passage 20 to a position A which is an upstream end of the cylindrical passage 20. As the air flow travels downstream from the position A, the air flow inside the cylindrical passage 20 takes in the water vapor contained in the air flow passing through the passages above and below the cylindrical passage 20, whereby a humidity boundary layer 21 develops near the upper and lower wall surfaces of the cylindrical passage 20. The humidity boundary layer 21 is a layer of air that is more humid than the main stream of the air flow passing through the center of the cylindrical passage 20. In the cylindrical passage 20, the air flow from the position A travels to position B and then to position C downstream of the position A while receiving transfer of the latent heat. An increase ΔW added to the absolute humidity W0 at the time of inflow of the air to the position A increases as the air travels downstream. An absolute humidity Wt near the upper and lower wall surfaces of the cylindrical passage 20 also increases as the air travels downstream from the position A.

The humidity boundary layer 21 reaches a steady state at a point that is X in length from the position A. A section between the position A and such a point is referred to as an inlet section in mass transfer. The length X is referred to as an inlet length which is the length of the inlet section. If the latent heat shielding member 12 is not provided in the cylindrical passage 20, the humidity boundary layer 21 is in the steady state downstream of the inlet section in the cylindrical passage 20. The air flow travels through the cylindrical passage 20 while the absolute humidity Wt near the upper and lower wall surfaces of the cylindrical passage 20 remains higher than the absolute humidity of the main stream. The lower the absolute humidity Wt near the upper and lower wall surfaces of the cylindrical passage 20, the more efficiently the air flow in the cylindrical passage 20 takes in the water vapor contained in the air flow passing through the passages above and below the cylindrical passage 20. The efficiency of transferring the latent heat to the air flow in the cylindrical passage 20 decreases when the absolute humidity Wt remains high near the upper and lower wall surfaces downstream of the inlet section.

The latent heat shielding member 12 shields transfer of the latent heat from the passages above and below the cylindrical passage 20 to the air flow inside the cylindrical passage 20. The transfer of the latent heat is shielded by the latent heat shielding member 12 at a position that is X in length from the position A, whereby the humidity boundary layer 21 in the steady state is reset for the moment. As a result, the absolute humidity Wt near the upper and lower wall surfaces at a position D, which corresponds to a downstream portion of the latent heat shielding member 12, can be significantly reduced from the absolute humidity Wt at the time the humidity boundary layer 21 is in the steady state. The air flow passing through the cylindrical passage 20 can efficiently take in the water vapor from the passages above and below the cylindrical passage in a next inlet section from the position D.

The total heat exchange element 1 shields transfer of the latent heat using the latent heat shielding member 12 provided in some regions to enable efficient transfer of the latent heat outside the regions where the latent heat shielding member 12 is provided. Unlike the case where efficient transfer of the latent heat is achieved by generating air flow disturbance in the passage, the total heat exchange element 1 can reduce the air flow disturbance in the passage and can thus reduce a pressure loss and improve the latent heat transfer efficiency. The total heat exchange element 1 can improve the total heat exchange efficiency by improving the latent heat transfer efficiency. The total heat exchange element 1 can improve the total heat exchange efficiency with a configuration equivalent in size to an existing total heat exchange element by adding the latent heat shielding member 12 to the configuration similar to that of the existing total heat exchange element. Furthermore, the pressure loss of the total heat exchange element 1 can be reduced so that the total heat exchange element 1 can be applied to a total heat exchanger having the layout similar to that of an existing total heat exchanger.

The spacing between the upstream end 13A and one of the latent heat shielding members 12A and the spacing between the latent heat shielding members 12A illustrated in FIG. 2 are each set to the length X which is the inlet length in the mass transfer for the first passage 5. The total heat exchange element 1 can thus improve the efficiency of transferring the latent heat from the second air flow 8 to the first air flow 7. Note that at least one of the spacing between the upstream end 13A and one of the latent heat shielding members 12A and the spacing between the latent heat shielding members 12A need only coincide with the length X which is the inlet length.

The spacing between the upstream end 13B and one of the latent heat shielding members 12B and the spacing between the latent heat shielding members 12B are each set to the length X which is the inlet length in the mass transfer for the second passage 6. The total heat exchange element 1 can thus improve the efficiency of transferring the latent heat from the first air flow 7 to the second air flow 8. Note that at least one of the spacing between the upstream end 13B and one of the latent heat shielding members 12B and the spacing between the latent heat shielding members 12B need only coincide with the length X which is the inlet length.

In one example, the length X for the latent heat shielding members 12A satisfies the relationship of the following expression (1). The equivalent diameter of the first passage 5 is denoted by "De". The equivalent diameter of the first passage 5 is the inner diameter of a cylindrical passage that can be regarded as equivalent to the first passage 5 in terms of the flow of the air flow. The Reynolds number of the first air flow 7 is denoted by "Re". The Prandtl number of the first air flow 7 is denoted by "Pr".

$$X = 0.06 \times Re \times De \times Pr \quad (1)$$

Figure 4:
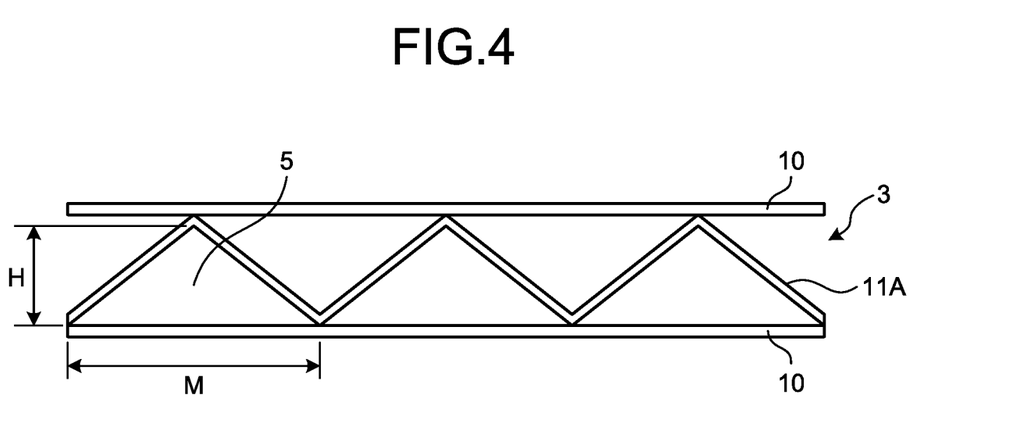
FIG. 4 is a view illustrating a cross section of a first layer illustrated in FIG. 1.

FIG. 4 is a view illustrating a cross section of the first layer 3 illustrated in FIG. 1. The cross section illustrated in FIG. 4 is parallel to the second direction. The first passage 5 is assumed to form an isosceles triangle of height H and base M. The equivalent diameter De of the first passage 5 is expressed by the following expression (2). The cross-sectional area of the first passage 5 is denoted by "S". The circumference of the cross section of the first passage 5 is denoted by "L".

$$De = 4 \times S/L \quad (2)$$

The Reynolds number Re is expressed by the following expression (3). The average flow rate of the first air flow 7 through the first passage 5 is denoted by "V". The unit of "V" is meters per second. The kinematic viscosity of the first air flow 7 through the first passage 5 is denoted by "v". The unit of "v" is square meters per second.

$$Re = De \times V/v \quad (3)$$

When the first passage 5 has the base M of 6 mm and the height H of 2 mm, the cross-sectional area S is equal to 6 mm$^2$ and the circumference L is equal to approximately 13.2 mm. According to expression (2), the equivalent diameter De is equal to approximately 1.8 mm. When the temperature of the air is 20° C., the kinematic viscosity ν is equal to $1.5 \times 10^{-5}$ m$^2$/s. According to expression (3), the Reynolds number Re is equal to 121×V. From expression (1), the length X is calculated as X=0.0092×V (m) which is a function with the average flow rate V as a variable. Note that the length X for the latent heat shielding members 12B can be calculated similarly to the case of the latent heat shielding members 12A.

In one example, assuming that the average flow rate V is 2 m/s, which is a typical flow rate in the total heat exchange element 1, the length X is calculated to be approximately 18 mm. In the total heat exchange element 1 including the first passage 5 with the base M of 6 mm, one latent heat shielding member 12B is provided for every three first passages 5. Moreover, in the total heat exchange element 1 including the second passage 6 with the base M of 6 mm, one latent heat shielding member 12A is provided for every three second passages 6. The arrangement of the latent heat shielding members 12 can be optimized by the sizes of the first passage 5 and the second passage 6 and the of flow rates of the first air flow 7 and the second air flow 8.

Note that when the first passages 5 or the second passages 6 of the total heat exchange element 1 include passages with different average flow rates, the length X may be set in accordance with the average flow rate in the passages. The latent heat shielding members 12 provided in passages with average flow rates V1, V2, and V3 may have lengths X1, X2, and X3 corresponding to the average flow rates V1, V2, and V3, respectively.

Figure 5:
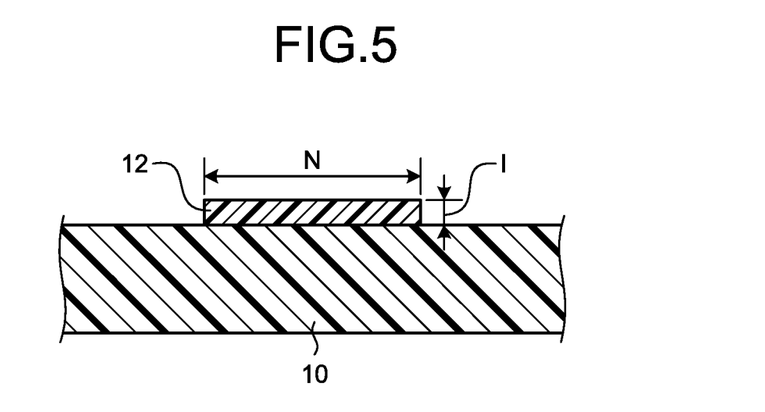
FIG. 5 is a view illustrating a cross section of the partition member and the latent heat shielding member illustrated in FIG. 2.

FIG. 5 is a view illustrating a cross section of the partition member 10 and the latent heat shielding member 12 illustrated in FIG. 2. FIG. 5 illustrates the cross section of one latent heat shielding member 12, a portion of the partition member 10 where the latent heat shielding member 12 is provided, and a portion therearound. The thickness I of the latent heat shielding member 12 from the surface of the partition member 10 is 0.2 mm or less.

As the thickness I increases, the passage is narrowed at the site of the latent heat shielding member 12 and increased downstream of the latent heat shielding member 12. The lower surface of the passage downstream of the latent heat shielding member 12 has a portion with a reduced air flow to be, so to speak, a shadow of the latent heat shielding member 12. The air flow is separated from the sensible heat and latent heat transfer surface, so that the effective area of the transfer surface is reduced and the efficiency of total heat exchange in the total heat exchange element 1 is reduced. In addition, the separation of the air flow requires that the length X corresponding to the inlet length is estimated longer. It is desirable that the length X be shorter in order to enable efficient total heat exchange in the total heat exchange element 1.

The total heat exchange element 1 reduces the air flow disturbance at the site of the latent heat shielding member 12 as much as possible by having the thickness I of 0.2 mm or less. Reducing the separation of the air flow from the sensible heat and latent heat transfer surface as much as possible can increase the effective area of the transfer surface, whereby the total heat exchange element 1 can improve the efficiency of total heat exchange. The total heat exchange element 1 can also reduce a pressure loss by reducing the air flow disturbance in the air path. Note that the thickness I may be limited to 0.1 mm or less. Accordingly, the total heat exchange element 1 can further improve the efficiency of total heat exchange and can reduce the pressure loss.

The latent heat shielding member 12 is provided in a partial region of width N. The latent heat shielding member 12A illustrated in FIG. 2 is provided in the first region whose width in the first direction is equal to N. The width N is included in the range that is 0.2 to 2 times the width of the first passage 5 in the second direction. Moreover, the latent heat shielding member 12B is provided in the second region whose width in the second direction is equal to N. The width N is included in the range that is 0.2 to 2 times the width of the second passage 6 in the first direction.

If the width N is smaller than 0.2 times the width of the first passage 5 or the second passage 6, it is difficult to change the humidity boundary layer 21 illustrated in FIG. 3 until the latent heat transfer efficiency downstream of the latent heat shielding member 12 can be improved. Moreover, if the width N is larger than twice the width of the first passage 5 or the second passage 6, the region other than the partial region where the latent heat shielding member 12 is provided is reduced, whereby the heat transfer efficiency may be reduced significantly due to the decrease in the effective area of the latent heat transfer surface. The total heat exchange element 1 can effectively improve the latent heat transfer efficiency by setting the width N within the range that is 0.2 to 2 times the width of the passage.

A sheet made of a moisture-proof material which is a vapor impermeable material is used for the latent heat shielding member 12. One example of the latent heat shielding member 12 is a sheet member made of polyethylene terephthalate, polypropylene, Acrylonitrile Butadiene Styrene (ABS) resin, or other resin materials. The sheet member with the thickness of 0.1 mm or less desirably has air resistance of 5000 seconds/100 cm$^3$ or more. The air resistance in seconds/100 cm$^3$ represents the time required for permeation of air of 100 cm$^3$ in an evaluation test according to JIS P 8117. The first embodiment regards the material as having vapor impermeability when the air resistance thereof is 5000 seconds/100 cm$^3$ or more.

A thin film made of a material having heat conductivity in addition to vapor impermeability may be used for the latent heat shielding member 12. A member having higher thermal conductivity than the partition member 10 can be used for the latent heat shielding member 12. The latent heat shielding member 12 may be a thin film made of aluminum or other metallic materials having high heat conductivity. In the case of an aluminum thin film, the air resistance of 5000 seconds/100 cm$^3$ or more can be achieved with the thickness of 5 μm or less. The thermal conductivity of the latent heat shielding member 12 is in the range of 0.2 to 30 W/m·K. As a result, the total heat exchange element 1 can improve the sensible heat transfer efficiency of the latent heat shielding member 12. The thermal conductivity of the latent heat shielding member 12 may be in the range of 0.5 to 25 W/m·K or, more specifically, 1 to 10 W/m·K.

The latent heat shielding member 12 is not limited to the sheet member affixed to the partition member 10. The latent heat shielding member 12 may be obtained by printing or applying a moisture-proof material on the partition member 10. The material of the latent heat shielding member 12 applied to the partition member 10 includes acrylic caulk for building use or water resistant vinyl acetate copolymer. The latent heat shielding member 12 is obtained by drying the material applied at a thickness of about 0.1 mm.

Figure 6:
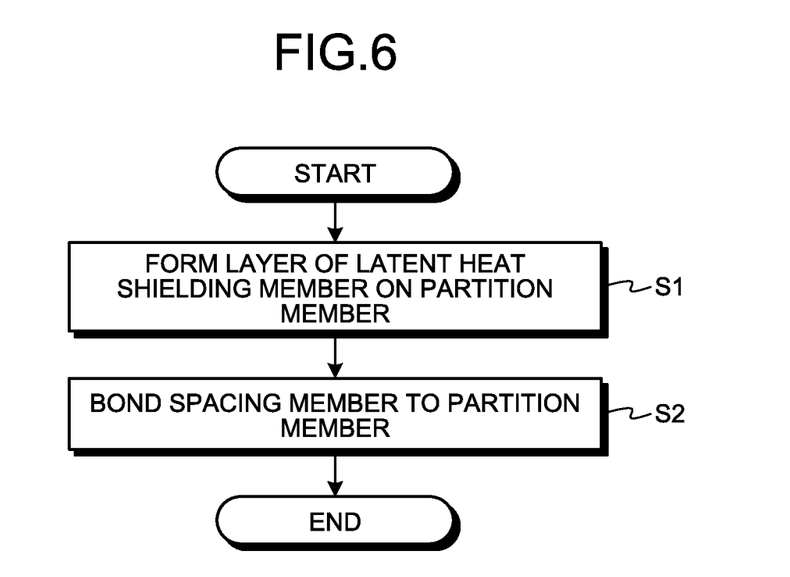
FIG. 6 is a flowchart illustrating a part of the procedure of a method of manufacturing the total heat exchange element according to the first embodiment.

FIG. 6 is a flowchart illustrating a part of the procedure of a method of manufacturing the total heat exchange element 1 according to the first embodiment. In step S1, a layer of the latent heat shielding member 12 is formed on the partition member 10. The latent heat shielding member 12 is formed by affixing the sheet member made of a moisture-proof material or by printing or applying the moisture-proof material. In step S2, the spacing member 11 is bonded to the partition member 10 using an adhesive. The spacing members 11A and the spacing members 11B are alternately stacked with the partition members 10 interposed therebetween, whereby the total heat exchange element 1 illustrated in FIG. 1 is formed.

According to the first embodiment, the total heat exchange element 1 includes the latent heat shielding members 12; therefore, the total heat exchange element 1 can improve the latent heat transfer efficiency and the total heat exchange efficiency. The total heat exchange element 1 thus has an effect of enabling total heat exchange with high efficiency. The total heat exchange element 1 can also reduce a pressure loss by including the latent heat shielding member 12.

Second Embodiment

Figure 7:
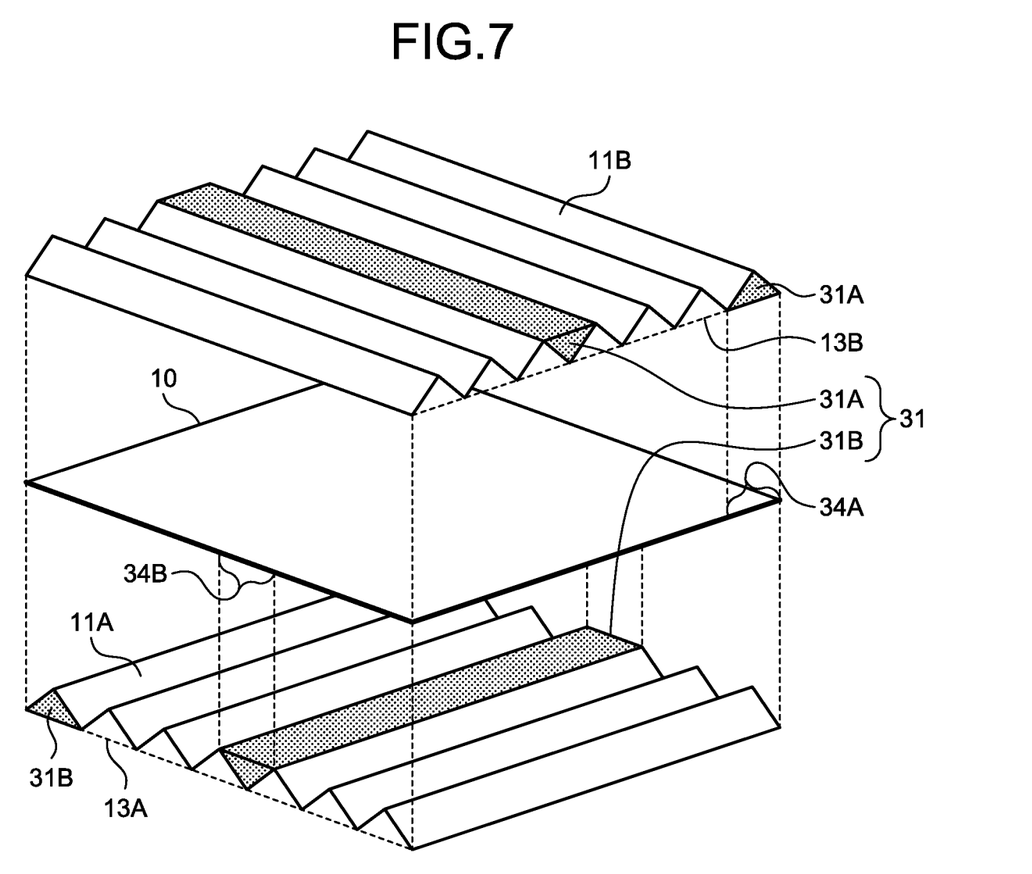
FIG. 7 is a perspective view illustrating the configuration of a part of the total heat exchange element according to a second embodiment of the present invention.

FIG. 7 is a perspective view illustrating the configuration of a part of the total heat exchange element 1 according to a second embodiment of the present invention. The total heat exchange element 1 according to the second embodiment includes a latent heat shielding member 31 filling a space between the partition member 10 and the spacing member 11. Parts identical to those of the first embodiment will be assigned the same reference numerals as those assigned thereto, whereby redundant description will be omitted. FIG. 7 illustrates one of the partition members 10 and the spacing members 11A and 11B bonded to the partition member 10.

The latent heat shielding members 31 include latent heat shielding members 31A and 31B whose longitudinal directions are perpendicular to each other. The latent heat shielding members 31A are provided in first regions 34A that are band-like regions orthogonal to the first direction. The longitudinal direction of the latent heat shielding members 31A coincides with the second direction. The latent heat shielding members 31A are provided between the partition members 10 and the spacing member 11B. The latent heat shielding members 31A fill two of the plurality of second passages 6 provided in the second layer 4 illustrated in FIG. 1. One of the latent heat shielding members 31A illustrated in FIG. 7 is provided in the first region 34A of the partition member 10 illustrated in FIG. 7, and the other is provided in the first region 34A of the partition member 10 above the partition member 10 illustrated in FIG. 7. The latent heat shielding members 31A are provided in the two first regions 34A that are spaced from each other in the first direction.

The latent heat shielding members 31B are provided in second regions 34B that are band-like regions orthogonal to the second direction. The longitudinal direction of the latent heat shielding members 31B coincides with the first direction. The latent heat shielding members 31B are provided between the partition members 10 and the spacing member 11A. The latent heat shielding members 31B fill two of the plurality of first passages 5 provided in the first layer 3 illustrated in FIG. 1. One of the latent heat shielding members 31B illustrated in FIG. 7 is provided in the second region 34B of the partition member 10 illustrated in FIG. 7, and the other is provided in the second region 34B of the partition member 10 below the partition member 10 illustrated in FIG. 7. The latent heat shielding members 31B are provided in the two second regions 34B that are spaced from each other in the second direction.

Figure 8:
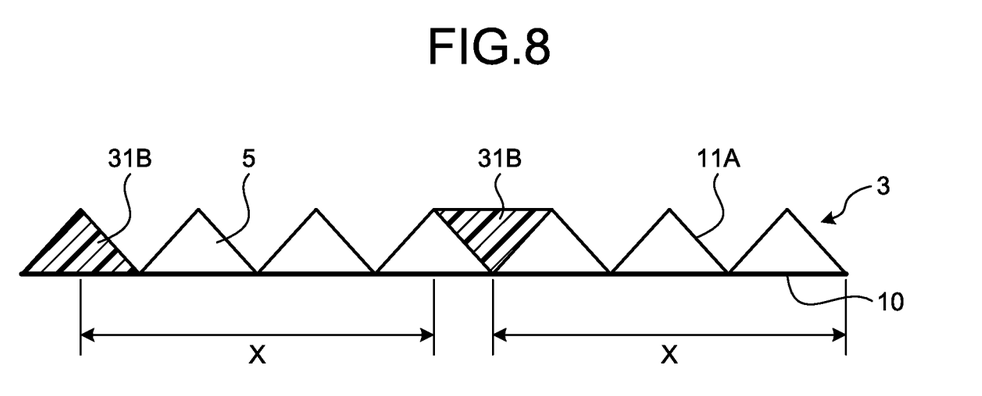
FIG. 8 is a view illustrating a cross section of a first layer including a spacing member illustrated in FIG. 7.

FIG. 8 is a view illustrating a cross section of the first layer 3 including the spacing member 11A illustrated in FIG. 7. One of the latent heat shielding members 31B fills a portion having a triangular cross section whose vertex is at a position that is X in length from the upstream end 13B of the second passages 6 illustrated in FIG. 7. On the partition member 10, the spacing between the upstream end 13B and the one of the latent heat shielding members 31B is set to the length X. Another one of the latent heat shielding members 31B fills a portion having a triangular cross section whose vertex is at a position that is X in length from the end of the one of the latent heat shielding members 31B in the second direction. On the partition member 10, the spacing between the two latent heat shielding members 31B is set to the length X. Note that the number of the latent heat shielding members 31B per partition member 10 is not limited to two but may be one or three or more.

As in the first embodiment, it is assumed that the length X is calculated to be approximately 18 mm. In the total heat exchange element 1 including the first passage 5 with the base M of 6 mm as illustrated in FIG. 4, one latent heat shielding member 31B is provided for every three first passages 5.

In a similar manner to the latent heat shielding members 31B in the first layer 3 illustrated in FIG. 8, the latent heat shielding members 31A illustrated in FIG. 7 are provided in the second layer 4 including the spacing member 11B. The number of the latent heat shielding members 31A per partition member 10 is not limited to two but may be one or three or more. The arrangement of the latent heat shielding members 31 can be optimized by the sizes of the first passage 5 and the second passage 6 and the flow rates of the first air flow 7 and the second air flow 8.

The latent heat shielding member 31 is made of a moisture-proof material which is a vapor impermeable material. The latent heat shielding member 31 may be made of a material having heat conductivity in addition to vapor impermeability. The latent heat shielding member 31 can be made of a material having higher thermal conductivity than the partition member 10. One example of the material of the latent heat shielding member 31 is a sealing agent used for bonding electronic components. The sealing agent is used to bond electronic components and heat dissipating fins. The thermal conductivity of the latent heat shielding member 31 is in the range of 0.2 to 30 W/m·K. As a result, the total heat exchange element 1 can improve the sensible heat transfer efficiency of the latent heat shielding member 31. The thermal conductivity of the latent heat shielding member 31 may be in the range of 0.5 to 25 W/m·K or, more specifically, 1 to 10 W/m·K.

Figure 9:
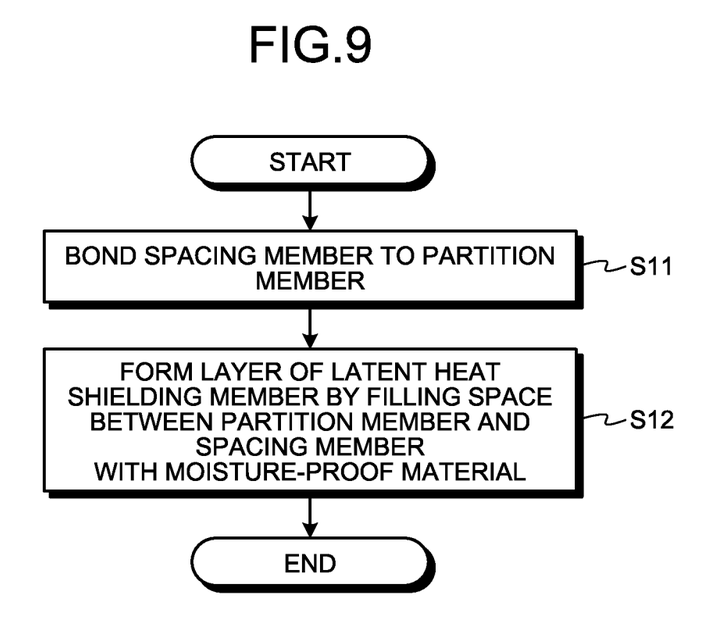
FIG. 9 is a flowchart illustrating a part of the procedure of a method of manufacturing the total heat exchange element according to the second embodiment.

FIG. 9 is a flowchart illustrating a part of the procedure of a method of manufacturing the total heat exchange element 1 according to the second embodiment. In step S11, the spacing member 11 is bonded to the partition member 10 using an adhesive. The spacing members 11A and the spacing members 11B are alternately stacked with the partition members 10 interposed therebetween.

In step S12, the space between the partition member 10 and the spacing member 11 is filled with the moisture-proof material to form a layer of the latent heat shielding member 31. The latent heat shielding members 31B are formed by filling the space between the partition members 10 and the spacing member 11A with the moisture-proof material. The portion of the first layer 3 other than the portion where the latent heat shielding members 31B are formed becomes the first passages 5. The latent heat shielding members 31A are formed by filling the space between the partition members 10 and the spacing member 11B with the moisture-proof material. The portion of the second layer 4 other than the portion where the latent heat shielding members 31A are formed becomes the second passages 6. Consequently, the total heat exchange element 1 according to the second embodiment is formed.

According to the second embodiment, the total heat exchange element 1 includes the latent heat shielding members 31; therefore, the total heat exchange element 1 can improve the latent heat transfer efficiency and the total heat exchange efficiency. The total heat exchange element 1 thus has an effect of enabling total heat exchange with high efficiency.

Third Embodiment

Figure 10:
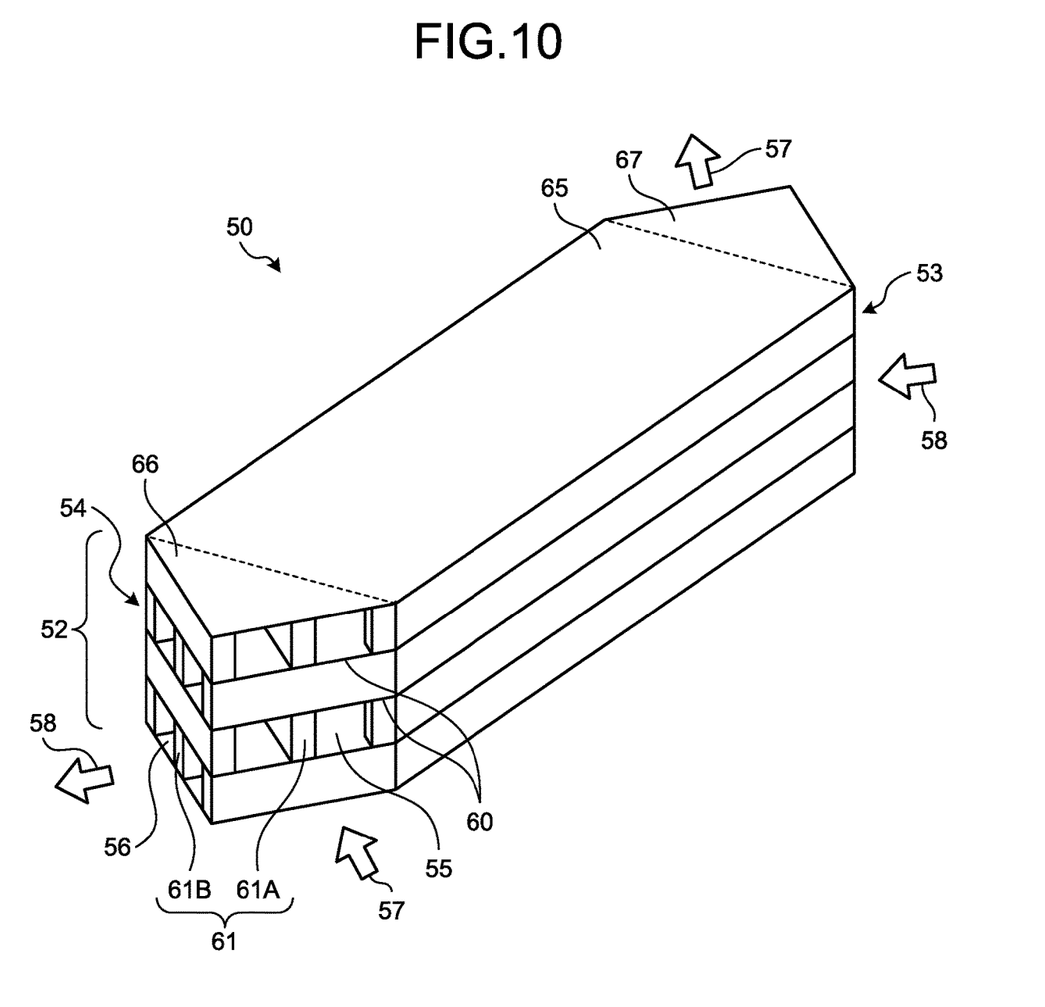
FIG. 10 is a perspective view of a total heat exchange element according to a third embodiment of the present invention.

FIG. 10 is a perspective view of a total heat exchange element 50 according to a third embodiment of the present invention. The total heat exchange element 50 is a counterflow total heat exchange element in which the direction of travel of a first air flow 57 and the direction of travel of a second air flow 58 in the total heat exchange element 50 are different from each other by 180 degrees. Parts identical to those of the first embodiment will be assigned the same reference numerals as those assigned thereto, whereby redundant description will be omitted.

The total heat exchange element 50 includes a counterflow passage portion 65, a first separation passage portion 66, and a second separation passage portion 67. The counterflow passage portion 65 has the shape of a rectangular parallelepiped. The counterflow passage portion 65 forms therein passages in which the direction of travel of the first air flow 57 and the direction of travel of the second air flow 58 are different from each other by 180 degrees. The first separation passage portion 66 is connected to an end of the counterflow passage portion 65 corresponding to the upstream side of the first air flow 57 and the downstream side of the second air flow 58. The second separation passage portion 67 is connected to an end of the counterflow passage portion 65 corresponding to the downstream side of the first air flow 57 and the upstream side of the second air flow 58. The first separation passage portion 66 and the second separation passage portion 67 each have the shape of a triangular prism.

The total heat exchange element 50 includes a stacked body 52 in which first layers 53 and second layers 54 are stacked alternately. The stacked body 52 includes partition members 60 between the first layers 53 and the second layers 54, and spacing ribs 61 as spacing members for maintaining the spacing between the partition members 60. The spacing rib 61 has a rectangular cross-sectional shape. As an example, the spacing rib 61 is a member molded from a resin material.

A spacing rib 61A is provided in the first layer 53. A first passage 55 is a space enclosed by the spacing rib 61A and the partition members 60 in the first layer 53. The direction of travel of the first air flow 57 through the first passage 55 formed in the counterflow passage portion 65 coincides with a first direction.

A spacing rib 61B is provided in the second layer 54. A second passage 56 is a space enclosed by the spacing rib 61B and the partition members 60 in the second layer 54. The direction of travel of the second air flow 58 through the second passage 56 formed in the counterflow passage portion 65 coincides with a second direction that is different from the first direction by 180 degrees.

In the first separation passage portion 66, an upstream end of the first passage 55 and a downstream end of the second passage 56 are oriented in different directions from each other. In the second separation passage portion 67, a downstream end of the first passage 55 and an upstream end of the second passage 56 are oriented in different directions from each other.

The total heat exchange element 50 exchanges sensible heat between the first air flow 57 and the second air flow 58 by heat conduction through the partition members 60. The total heat exchange element 50 also exchanges latent heat between the first air flow 57 and the second air flow 58 by permeation of water vapor through the partition members 60. Note that the number of each of the first layers 53 and the second layers 54 in the stacked body 52 is arbitrary. Moreover, the number of the first passages 55 in the first layer 53 and the number of the second passages 56 in the second layer 54 are arbitrary.

Figure 11:
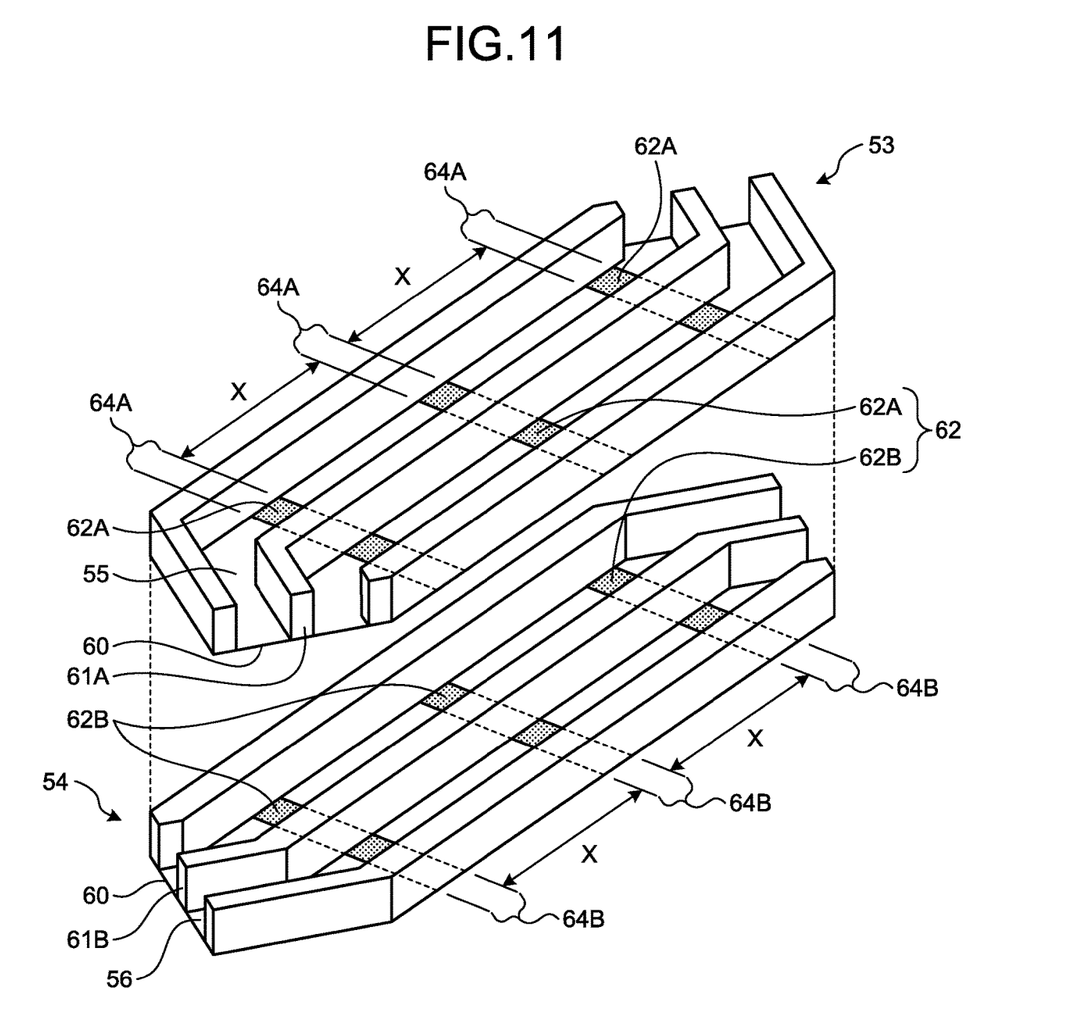
FIG. 11 is a perspective view illustrating a first layer and a second layer illustrated in FIG. 10.

FIG. 11 is a perspective view illustrating the first layer 53 and the second layer 54 illustrated in FIG. 10. Latent heat shielding members 62 are provided partly on the partition members 60. The latent heat shielding members 62 shield transfer of latent heat between the first air flow 57 and the second air flow 58 through the partition member 60. The latent heat shielding members 62 are provided in each of the partition members 60 in the stacked body 52 illustrated in FIG. 10.

The latent heat shielding members 62 include latent heat shielding members 62A provided on the partition members 60 that form lower surfaces of the first layers 53, and latent heat shielding members 62B provided on the partition members 60 that form lower surfaces of the second layers 54. The latent heat shielding members 62A are provided in first regions 64A that are band-like regions intersecting the first direction. The longitudinal direction of the first regions 64A is perpendicular to the first direction. The latent heat shielding members 62A are provided to cross the plurality of first passages 55 in the first layer 53. On the partition member 60 of the first layer 53 illustrated in FIG. 11, the latent heat shielding members 62A are provided in three first regions 64A that are spaced from one another in the first direction.

The spacing between the three first regions 64A is set to the length X. The length X corresponds to the inlet length in mass transfer of the first passages 55. The spacing between the upstream end of one of the plurality of first passages 55 and one of the latent heat shielding members 62A may be set to the length X. Note that at least one spacing between the latent heat shielding members 62A need only coincide with the length X that is the inlet length. The number of the latent heat shielding members 62A per partition member 60 is not limited to three but may be one or two, or four or more.

The latent heat shielding members 62B are provided in second regions 64B that are band-like regions intersecting the second direction. The longitudinal direction of the second regions 64B is perpendicular to the second direction and coincides with the longitudinal direction of the first regions 64A. The latent heat shielding members 62B are provided to cross the plurality of second passages 56 in the second layer 54. On the partition member 60 of the second layer 54 illustrated in FIG. 11, the latent heat shielding members 62B are provided in three second regions 64B that are spaced from one another in the second direction.

The spacing between the three second regions 64B is set to the length X. The length X corresponds to the inlet length in mass transfer of the second passages 56. The spacing between the upstream end of one of the plurality of second passages 56 and one of the latent heat shielding members 62B may be set to the length X. Note that at least one spacing between the latent heat shielding members 62B need only coincide with the length X that is the inlet length. The number of the latent heat shielding members 62B per partition member 60 is not limited to three but may be one or two, or four or more.

As one example, the length X for the latent heat shielding members 62A and 62B satisfies the relationship of the above expression (1) as with the first embodiment.

Figure 12:
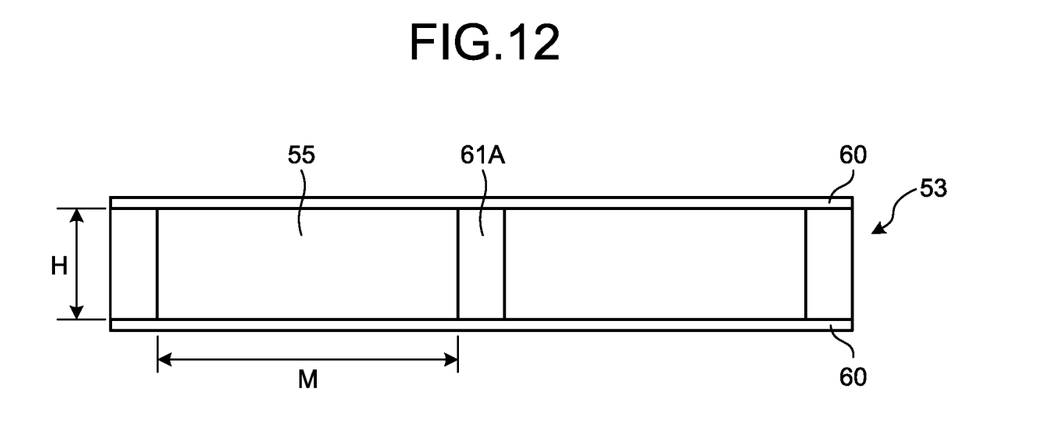
FIG. 12 is a view illustrating a cross section of the first layer illustrated in FIG. 10.

FIG. 12 is a view illustrating a cross section of the first layer 53 illustrated in FIG. 10. The cross section illustrated in FIG. 12 is a cross section of the counterflow passage portion 65 and is perpendicular to the first direction. The first passage 55 is assumed to form a rectangle of height H and width M. When the height H is 1.8 mm and the width M is 6 mm, the first passage 55 has the cross-sectional area S equal to 10.8 mm$^2$ and the circumference L equal to 15.6 mm. According to expression (2) above, the equivalent diameter De is equal to approximately 2.8 mm. When the temperature of the air is 20° C., the kinematic viscosity v is equal to 1.5×10$^{-5}$ m$^2$/s. According to expression (3) above, the Reynolds number Re is equal to 185×V. From expression (1), the length X is calculated as X=0.0107×V (m) which is a function with the average flow rate V as a variable. Note that the length X for the latent heat shielding members 62B can be calculated similarly to the case of the latent heat shielding members 62A.

In one example, assuming that the average flow rate V is 2 m/s, which is a typical flow rate in the total heat exchange element 50, the length X is calculated to be approximately 21 mm. In the total heat exchange element 50 including the first passage 55 with the width M of 6 mm, the latent heat shielding member 62A is provided at every 3.5 times the width M in length. Moreover, in the total heat exchange element 50 including the second passage 56 with the width M of 6 mm, the latent heat shielding member 62B is provided at every 3.5 times the width M in length. The arrangement of the latent heat shielding members 62 can be optimized by the sizes of the first passage 55 and the second passage 56 and the flow rates of the first air flow 57 and the second air flow 58.

As with the first embodiment, the thickness I of the latent heat shielding member 62 from the surface of the partition member 60 is 0.2 mm or less. The total heat exchange element 50 reduces the air flow disturbance at the site of the latent heat shielding member 62 as much as possible by having the thickness I of 0.2 mm or less. Reducing the separation of the air flow from the sensible heat and latent heat transfer surface as much as possible can increase the effective area of the transfer surface, whereby the total heat exchange element 50 can improve the efficiency of total heat exchange. The total heat exchange element 50 can also reduce a pressure loss by reducing the air flow disturbance in the air path. Note that the thickness I may be limited to 0.1 mm or less. Accordingly, the total heat exchange element 50 can further improve the efficiency of total heat exchange and can reduce the pressure loss.

As with the first embodiment, the latent heat shielding member 62A is provided in the first region 64A whose width in the first direction is equal to N. The width N is included in the range that is 0.2 to 2 times the width M of the first passage 55. The latent heat shielding member 62B is provided in the second region 64B whose width in the second direction is equal to N. The width N is included in the range that is 0.2 to 2 times the width M of the second passage 56. The total heat exchange element 50 can effectively improve the latent heat transfer efficiency by setting the width N within the range that is 0.2 to 2 times the width of the passage.

As with the latent heat shielding member 12 of the first embodiment, a sheet made of a moisture-proof material which is a vapor impermeable material is used for the latent heat shielding member 62. Alternatively, a thin film made of a material having heat conductivity in addition to vapor impermeability may be used for the latent heat shielding member 62. The latent heat shielding member 62 can be made of a member having higher thermal conductivity than the partition member 60. The thermal conductivity of the latent heat shielding member 62 is in the range of 0.2 to 30 W/m·K. As a result, the total heat exchange element 50 can improve the sensible heat transfer efficiency of the latent heat shielding member 62.

The latent heat shielding member 62 is not limited to the sheet member affixed to the partition member 60. The latent heat shielding member 62 may be obtained by printing or applying a moisture-proof material on the partition member 60. The latent heat shielding member 62 can be formed similarly to the latent heat shielding member 12 of the first embodiment.

As with the first and second embodiments, the total heat exchange element 50 may include a spacing member, which is a corrugated sheet member, instead of the spacing rib 61. The sheet member may be formed in the shape of a triangular wave or rectangular wave, or in another shape. Moreover, the total heat exchange element 1 of the first and second embodiments may include the spacing rib 61, which is the spacing member in the third embodiment, instead of the spacing member 11. The total heat exchange elements 1 and 50 can obtain the effect in which total heat exchange can be performed with high efficiency in any case.

According to the third embodiment, the total heat exchange element 50 includes the latent heat shielding members 62; therefore, the total heat exchange element 50 can improve the latent heat transfer efficiency and the total heat exchange efficiency. The total heat exchange element 50 thus has the effect of enabling total heat exchange with high efficiency. Moreover, as with the first embodiment, the total heat exchange element 50 can reduce a pressure loss by including the latent heat shielding members 62.

Figure 13:
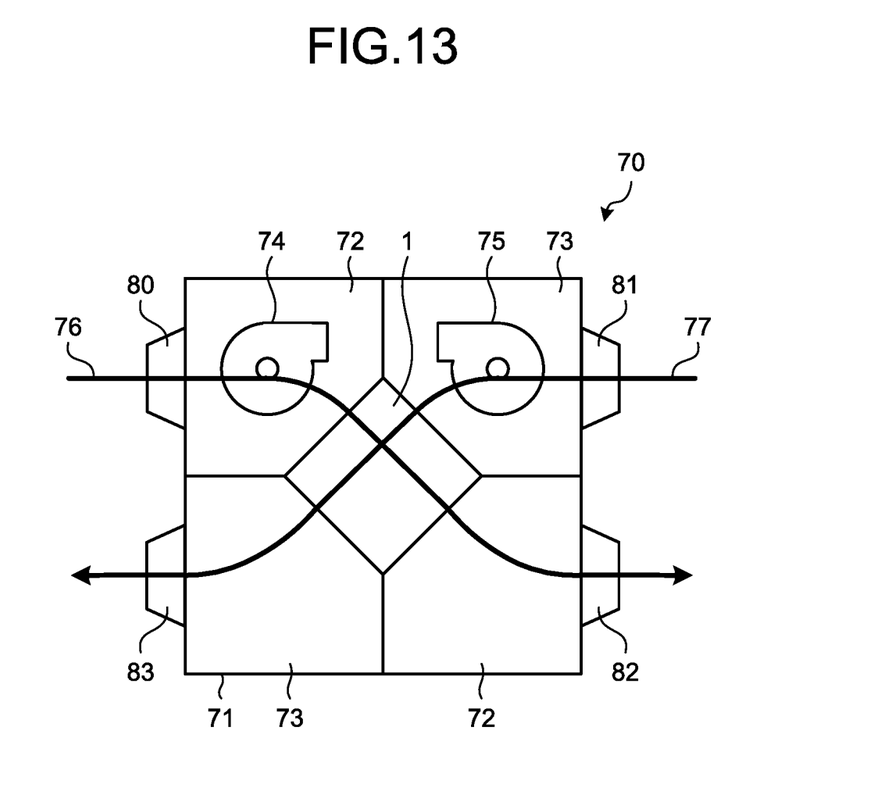
FIG. 13 is a diagram illustrating a schematic configuration of a total heat exchanger including the total heat exchange element according to the first embodiment.

Next, a total heat exchanger including the total heat exchange element 1 or 50 according to the first, second, or third embodiment will be described. FIG. 13 is a diagram illustrating a schematic configuration of a total heat exchanger 70 including the total heat exchange element 1 according to the first embodiment.

The total heat exchanger 70 includes a casing 71 provided with a supply air passage 72 through which a first air flow 76 passes and an exhaust air passage 73 through which a second air flow 77 passes. The first air flow 76 is a supply air flow from the outside to the inside of a room. The second air flow 77 is an exhaust air flow from the inside to the outside of a room. The total heat exchanger 70 further includes a supply blower 74 that generates the first air flow 76 in the supply air passage 72 and an exhaust blower 75 that generates the second air flow 77 in the exhaust air passage 73. FIG. 13 schematically illustrates a top view of the components provided in the casing 71.

A supply outlet 82 and an exhaust inlet 81 are provided in the side surface of the casing 71 on the indoor side. A supply inlet 80 and an exhaust outlet 83 are provided in the side surface of the casing 71 on the outdoor side. The total heat exchanger 70 operates the supply blower 74 and takes the outdoor air into the supply air passage 72 through the supply inlet 80, thereby generating the first air flow 76. The first air flow 76 travels through the supply air passage 72 and is blown out into a room from the supply outlet 82. Moreover, the total heat exchanger 70 operates the exhaust blower 75 and takes the indoor air into the exhaust air passage 73 through the exhaust inlet 81, thereby generating the second air flow 77. The second air flow 77 travels through the exhaust air passage 73 and is blown out to the outside of a room from the exhaust outlet 83.

The total heat exchange element 1 is provided at a position where the supply air passage 72 and the exhaust air passage 73 intersect each other. The total heat exchange element 1 performs total heat exchange between the first air flow 76 traveling through the supply air passage 72 and the second air flow 77 traveling through the exhaust air passage 73. The total heat exchanger 70 recovers the sensible heat and latent heat of the exhaust air flow from the room through the total heat exchange performed by the total heat exchange element 1, and transfers the recovered sensible heat and latent heat to the supply air flow. The total heat exchanger 70 also recovers the sensible heat and latent heat of the supply air flow from outside the room through the total heat exchange performed by the total heat exchange element 1, and transfers the recovered sensible heat and latent heat to the exhaust air flow. The total heat exchanger 70 improves the efficiency of heating/cooling and the efficiency of humidifying/dehumidifying the room, and can reduce the energy used for air conditioning of the room.

The total heat exchanger 70 may include the total heat exchange element 1 of the second embodiment or the total heat exchange element 50 of the third embodiment in place of the total heat exchange element 1 of the first embodiment. The total heat exchanger 70 includes the total heat exchange element 1 or 50 to have an effect of enabling total heat exchange with high efficiency.

The configurations illustrated in the above embodiments merely illustrate examples of an aspect of the present invention, and can thus be combined with another known technique or partially omitted and/or modified without departing from the scope of the present invention.

REFERENCE SIGNS LIST 1, 50 total heat exchange element; 2, 52 stacked body; 3, 53 first layer; 4, 54 second layer; 5, 55 first passage; 6, 56 second passage; 7, 57, 76 first air flow; 8, 58, 77 second air flow; 10, 60 partition member; 11, 11A, 11B spacing member; 12, 12A, 12B, 31, 31A, 31B, 62, 62A, 62B latent heat shielding member; 13A, 13B upstream end; 14A, 34A, 64A first region; 14B, 34B, 64B second region; 21 humidity boundary layer; 61, 61A, 61B spacing rib; 65 counterflow passage portion; 66 first separation passage portion; 67 second separation passage portion; 70 total heat exchanger; 71 casing; 72 supply air passage; 73 exhaust air passage; 74 supply blower; 75 exhaust blower; 80 supply inlet; 81 exhaust inlet; 82 supply outlet; 83 exhaust outlet.

The invention claimed is:

1. A total heat exchange element comprising:
a stacked body that is formed by alternately stacking a first layer and a second layer, the first layer being provided with a first passage through which a first air flow passes and the second layer being provided with a second passage through which a second air flow passes, wherein the stacked body includes:
a partition member between the first layer and the second layer;
a spacing member provided in the first layer and the second layer to maintain a spacing between the partition members facing each other; and
a latent heat shielding member provided in a first region and a second region on the partition member, the first region being a band-like region intersecting with a first direction that is a direction of travel of the first air flow and the second region being a band-like region intersecting with a second direction that is a direction of travel of the second air flow, and the latent heat shielding member shielding transfer of latent heat between the first air flow and the second air flow through the partition member,
the latent heat shielding member is provided in a plurality of the first regions spaced from each other in the first direction and in a plurality of the second regions spaced from each other in the second direction wherein the latent heat shielding member is a thin film made of a metallic material.

2. The total heat exchange element according to claim 1, wherein the latent heat shielding member is a thin film sheet member made of a moisture-proof material and affixed to the partition member.

3. The total heat exchange element according to claim 1, wherein a thickness of the latent heat shielding member from the partition member is 0.2 mm or less.

4. The total heat exchange element according to claim 1, wherein a space between the partition member and the spacing member is filled with the latent heat shielding member.

5. The total heat exchange element according to claim 1, wherein a width of the first region in the first direction is within a range that is 0.2 to 2 times a width of the first passage in a direction perpendicular to the first direction.

6. The total heat exchange element according to claim 1, wherein a width of the second region in the second direction is within a range that is 0.2 to 2 times a width of the second passage in a direction perpendicular to the second direction.

7. The total heat exchange element according to claim 1, wherein the first direction and the second direction are perpendicular to each other.

8. The total heat exchange element according to claim 1, wherein the first direction and the second direction are different from each other by 180 degrees.

9. The total heat exchange element according to claim 1, wherein thermal conductivity of the latent heat shielding member is in a range of 0.2 to 30 W/m·K.

10. The total heat exchange element according to claim 1, wherein the thin film is an aluminum thin film.

11. The total heat exchange element according to claim 1, wherein the spacing member is bonded to the partition member using an adhesive, and
the latent heat shielding member fills at least part of a plurality of spaces formed between the partition member and the spacing member bonded using the adhesive.

12. A method of manufacturing a total heat exchange element that includes a partition member between a first layer provided with a first passage through which a first air flow passes and a second layer provided with a second passage through which a second air flow passes, and a spacing member provided in the first layer and the second layer and maintaining a spacing between the partition members facing each other, the method comprising:
forming a layer of a latent heat shielding member in a first region and a second region on the partition member, the first region being a band-like region intersecting with a first direction that is a direction of travel of the first air flow and the second region being a band-like region intersecting with a second direction that is a direction of travel of the second air flow; and bonding the spacing member to the partition member, wherein the layer of the latent heat shielding member is formed in a plurality of the first regions spaced from each other in the first direction and in a plurality of the second regions spaced from each other in the second direction wherein the latent heat shielding member is a thin film made of a metallic material.

13. The method of manufacturing a total heat exchange element according to claim 12, wherein the layer of the latent heat shielding member is formed by applying a moisture-proof material to the first region and the second region.

14. The method of manufacturing a total heat exchange element according to claim 12, wherein the layer of the latent heat shielding member is formed by affixing a thin film sheet made of a moisture-proof material to the first region and the second region.

15. The method of manufacturing a total heat exchange element according to claim 12, wherein the layer of the latent heat shielding member is formed by filling a space between the partition member and the spacing member with a moisture-proof material.

16. A total heat exchanger comprising:
a first blower to generate a first air flow;
a second blower to generate a second air flow; and
a total heat exchange element to perform total heat exchange between the first air flow and the second air flow, the total heat exchange element including a stacked body that is formed by alternately stacking a first layer and a second layer, the first layer being provided with a first passage through which the first air flow passes and the second layer being provided with a second passage through which the second air flow passes, wherein the stacked body includes:

a partition member between the first layer and the second layer;

a spacing member provided in the first layer and the second layer to maintain a spacing between the partition members facing each other; and a latent heat shielding member provided in a first region and a second region on the partition member, the first region being a band-like region intersecting with a first direction that is a direction of travel of the first air flow and the second region being a band-like region intersecting with a second direction that is a direction of travel of the second air flow, and the latent heat shielding member shielding transfer of latent heat between the first air flow and the second air flow through the partition member, the latent heat shielding member is provided in a plurality of the first regions spaced from each other in the first direction and in a plurality of the second regions spaced from each other in the second direction wherein the latent heat shielding member is a thin film made of a metallic material.

* * * * *